United States Patent [19]
Davis

[11] Patent Number: 4,737,825
[45] Date of Patent: Apr. 12, 1988

[54] PRINTER WITH TRAVERSING LENS AND PRINTING METHOD

[76] Inventor: Robert C. Davis, 11691 W. 85th St., Lenexa, Kans. 66214

[21] Appl. No.: 930,522

[22] Filed: Nov. 14, 1986

[51] Int. Cl.$^4$ ............................................. G03B 27/44
[52] U.S. Cl. ....................................... 355/54; 355/46; 355/74
[58] Field of Search ....................... 355/54, 53, 46, 74

[56] References Cited

U.S. PATENT DOCUMENTS

| | | |
|---|---|---|
| 1,186,034 | 6/1916 | Pilkington . |
| 1,892,683 | 1/1933 | Robertson ............................ 355/54 |
| 3,169,441 | 2/1965 | Johnson . |
| 3,292,485 | 12/1966 | Mey ...................................... 355/74 |
| 3,502,411 | 3/1970 | Wells . |
| 3,689,149 | 9/1972 | Livingood . |
| 3,858,974 | 1/1975 | Liguori . |
| 4,175,854 | 11/1979 | Ammann et al. . |
| 4,231,659 | 11/1980 | Logan . |
| 4,232,962 | 11/1980 | Gauer . |
| 4,607,949 | 8/1986 | Hakamada et al. ................... 355/74 |

*Primary Examiner*—Monroe H. Hayes
*Attorney, Agent, or Firm*—Litman, McMahon & Brown

[57] ABSTRACT

A printer includes a light source, a film carrier and a print paper support. A lens turret is mounted between the film carrier and the print paper support and is rotatable about a rotational axis. The lens turret is transversely movable with respect to the path of movement of the print paper whereby an image projected through the film and the lens is transversely movable across the print paper. The lens turret has a plurality of individual lenses for making different sizes of prints. A control system coordinates the longitudinal movement of the print paper and the rotational and transverse movements of the lens turret. A printing method utilizing the printer includes the step of transversely shifting the lens turret whereby the image is shifted transversely on the print paper.

2 Claims, 1 Drawing Sheet

PRINTER WITH TRAVERSING LENS AND PRINTING METHOD

BACKGROUND OF THE INVENTION

1. Field of the Invention

The present invention relates generally to printers, and in particular to a photographic printer with a traversing lens turret and a printing method.

2. Description of the Prior Art

Photographic printers generally include a light source, a film carrier for positioning the developed film for illumination by the light source, a lens or lenses for focusing the film image illuminated by the light source and a print paper support which receives the focused illumination from the lens. The photographic image is focused and the size of the print is determined by adjusting the positions of the aforementioned components relative to each other.

In "on axis" printing, individual prints are made consecutively from the photographic images. Only a single lens is required for such printing, but it can also be accomplished with a plurality of individual lenses placed at spaced locations on a lens turret or lens array. On axis printers often include multiple lenses for making prints of different sizes. For example, the Pilkington U.S. Pat. No. 1,186,034 discloses an on axis printing apparatus.

Multiple photographic prints can be made simultaneously with an "off axis" or "cluster" printing process wherein a cluster of lenses is exposed to the image for making multiple identical prints thereof. For example, the Johnson U.S. Pat. No. 3,169,441 discloses a lens turret with a lens cluster comprising four individual lenses positioned in a square pattern for simultaneously making four separate prints from the same negative. A single lens is also mounted on the turret of the Johnson apparatus. By rotating the turret, either the single lens or the lens cluster can be brought into the optical axis or light path for making a single print or multiple prints respectively from a single film exposure.

However, a disadvantage with the type of off-axis printing system shown in the Johnson patent is that the multiple lens assemblies tend to be relatively expensive. Furthermore, the variety of different print sizes and configurations that can be printed as a package or batch is somewhat limited by the configuration of the multiple lenses, e.g. the four lenses positioned in a square pattern as shown in the Johnson patent. Although lens arrays and turrets can be provided with virtually endless combinations of lenses, the variety of photographic print patterns made possible thereby is accompanied by a greater cost for the multiple lenses. Furthermore, in a lens array or turret with a large number of single and multiple lens assemblies, some of them can be expected to receive only occasional use, whereby the entire lens array or turret is somewhat underutilized.

Student portraits comprise an example of photographic work that typically involves printing a package of multiple images from a single photograph. At many educational institutions, the students are individually photographed annually. The resulting photographs are often printed in yearbooks and the like, but prints thereof are generally made available for purchase. Typically, the photographer offers one or more packages comprising collections of different size prints of the student's portrait. The selection can be made from photographer's proofs, or a complete package of multiple prints may be provided to the student for purchasing all or part of the collection.

A typical collection of school portraits includes one or more prints large enough for framing; a number of small, wallet-size prints and some medium-size prints. The portrait photographers and commercial package printers who provide these services naturally plan the packages and the particular combinations of different-size portrait prints therein to appeal to the greatest possible number of customers. However, some of the off-axis printers with relatively few multiple lens assemblies are not well adapted for producing a wide variety of different-size print combinations. Thus, the commercial printer with such equipment may find it too costly to purchase the additional multiple lens assemblies necessary to vary his production.

On the other hand, much of the existing on-axis printing equipment is not well suited for package printing since it cannot make multiple print groupings which efficiently utilize the area of the print paper. Rather, many on-axis printing systems make prints which are centered along the travel path of the print paper as it advances.

Heretofore there has not been available a photographic printer or method of printing with the advantages and features of the present invention.

SUMMARY OF THE INVENTION

In the practice of the present invention, a printer is provided which includes a light source, a filmstrip carrier defining a longitudinal path of movement of a filmstrip and a print paper support along which the print paper moves longitudinally. A lens turret is mounted between the filmstrip carrier and the print paper support and includes a plurality of individual lenses. The lens turret is rotational about a vertical axis and is transversely shiftable about a horizontal axis in a direction transverse to the directions of movement of the filmstrip and the print paper. A mask assembly including a longitudinally-opposed pair of masking blades and a transversely-opposed pair of masking blades defines a printing aperture which is transversely movable with respect to the print paper. A control system is provided for automatically controlling the movements of the filmstrip, the lens turret, the print paper and the mask assembly whereby a plurality of prints of different sizes can be automatically printed on the print paper with a printing method utilizing the printer of the present invention.

OBJECTS OF THE INVENTION

The principal objects of the present invention are: to provide a printer for package printing; to provide such a printer which is adapted for printing batches of different-size prints from a single exposed frame; to provide such a printer which automatically prints batches of photographs with predetermined combinations of sizes; to provide such a printer which utilizes individual lenses for making prints one-at-a-time; to provide such a printer with a control system adapted for automatically causing a variety of different batch combinations to be printed; to provide such a printer which includes a mask assembly which is coordinated with the movements of a lens turret; to provide such a printer with a rotatable and transversely movable lens turret; to provide such a printer which is adapted for printing from individual exposures and from rolls of developed filmstrip; to provide such a printer which is economical to manufacture, efficient in operation, capable of a long operating life and particularly well adapted for the proposed usage thereof; to provide a printing method wherein a lens turret is shifted transversely with respect to the travel path of the print paper; to provide such a printing method wherein the movements of the filmstrip, the print paper and the lens turret are coordinated by control systems; and to provide such a method which is adapted for automatically printing batches of photographs of different sizes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
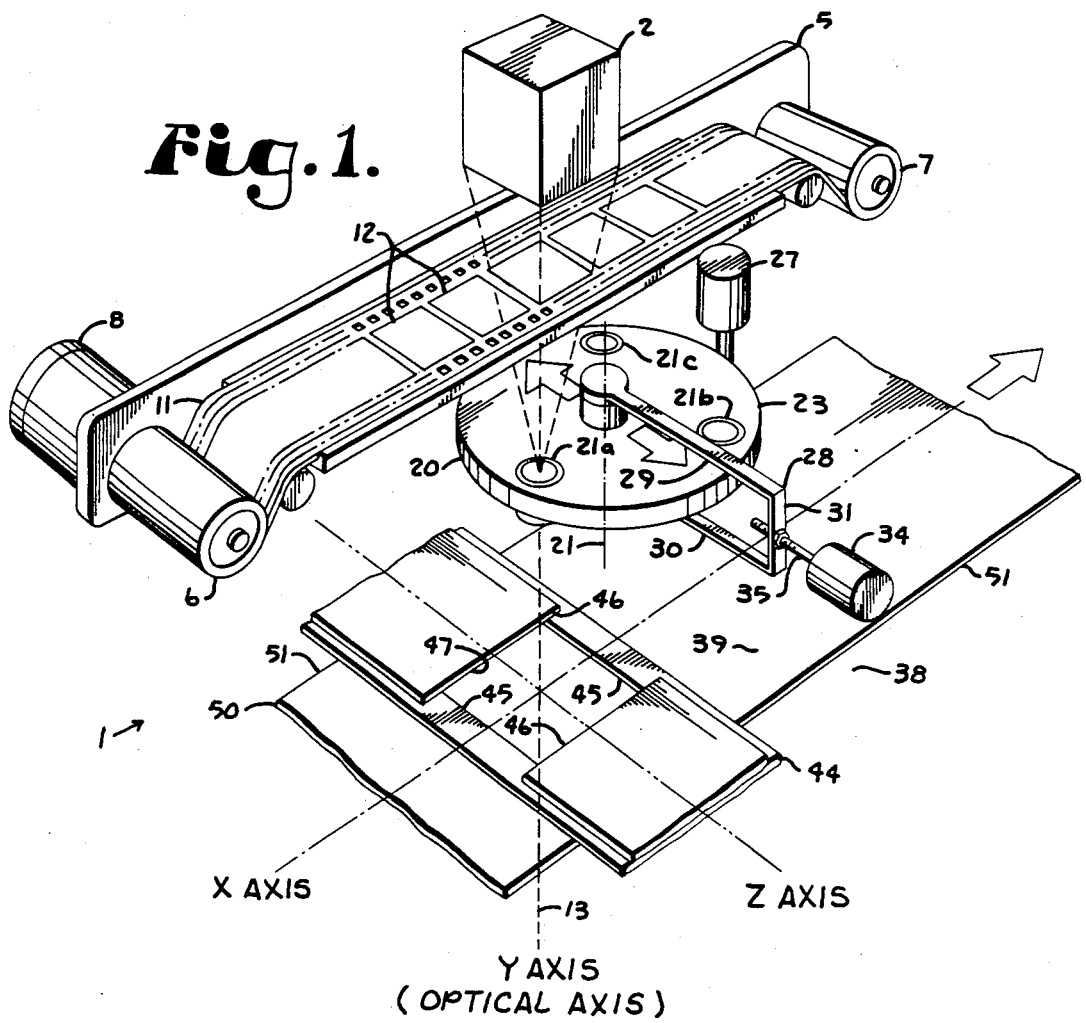
FIG. 1 is a perspective view of a printer with a traversing lens turret embodying the present invention.

Without limitation on the possible orientations of the present invention, the directional orientation in the description of the preferred embodiment is longitudinally along and parallel to the X axis, vertically along and parallel to the Y axis and transversely along and parallel to the Z axis, as shown in FIG. 1.

Referring to the drawings in more detail, the reference numeral 1 generally designates a printer embodying the present invention. The printer 1 includes a light source comprising, for example, a lamphouse 2 which is adapted for emitting light with controlled hue and intensity.

A filmstrip carrier 5 is provided below the lamphouse 2 and includes a film feed spool 6 and a film take-up spool 7 driven by a slow speed, synchronous motor 8. A developed negative roll of filmstrip 11 comprising a sequential plurality of frames 12 each recording a respective image to be printed is wound on the spools 6, 7 and extends longitudinally therebetween. The filmstrip carrier 5 is rotatable about an optical axis 13 collinear with the Y axis for orienting a negative frame 12 parallel to either the longitudinal X axis or the transverse Z axis. Although the printer 1 is adapted for printing multiple frames 12 on a roll of developed filmstrip 11, a film carrier for single exposures could likewise be employed with the present invention. In the operation of such a printer, the negatives or positives would be manually placed on the film carrier for printing.

A lens turret 20 is positioned below the filmstrip carrier 5 and is rotatable about a rotational axis 21 parallel to and in spaced relation from the optical axis 13. The lens turret 20 includes a plurality of interchangeable lenses 22 a-c that are positioned at radially-spaced intervals in proximity to the perimeter 23 of the lens turret 20. The lenses 22a-c form a ring concentric with the lens turret rotational axis 21 so that each is aligned with the optical axis 13 when the lens turret 20 is at a particular position.

A synchronous turret rotating motor 27 is operably connected to the lens turret 20 for rotating it about its rotational axis 21 in predetermined increments whereby the various lenses 22 are brought into alignment with the optical axis 13. The lens turret 20 is journalled in a turret clevis 28 with upper and lower arms 29, 30 interconnected by a clevis base 31 with a threaded aperture. A synchronous, reversible, lens turret shift motor 34 is coupled to a transversely-extending, threaded shift rod 35 which is threadably received in the threaded aperture of the clevis base 31 whereby operating the shift motor 34 moves the lens turret 20 transversely.

A print paper support 38 is located below the lens turret 20 and defines a printing plane 39. A reticulating mask assembly 44 is mounted on the print paper support 38 and includes an opposed pair of X masking blades reciprocable along the X axis and an opposed pair of Z masking blades reciprocable along the Z axis. The pairs of masking blades 45, 46 enclose a printing aperture 47. The X masking blades 45 are normally synchronized so that the printing aperture 47 is centered on the Z axis. However, the X masking blades can be shifted differentially along the X axis so that the printing aperture 47 moves accordingly to one side or the other of the Z axis. The Z masking blades 46 shift differentially along the Z axis so that the printing aperture 47 is movable transversely along or parallel to the Z axis. The masking blades 45, 46 are reciprocated by separate motors (not shown) of a type well known to those skilled in the art and heretofore used for this purpose.

Print paper 50 is advanced along the X axis on the print paper support 38 by a suitable advance mechanism (not shown) which may also be of a type which is well known in the industry. The print paper 50 has opposite side edges 51 which extend parallel to and equidistant from the X axis.

Figure 2:
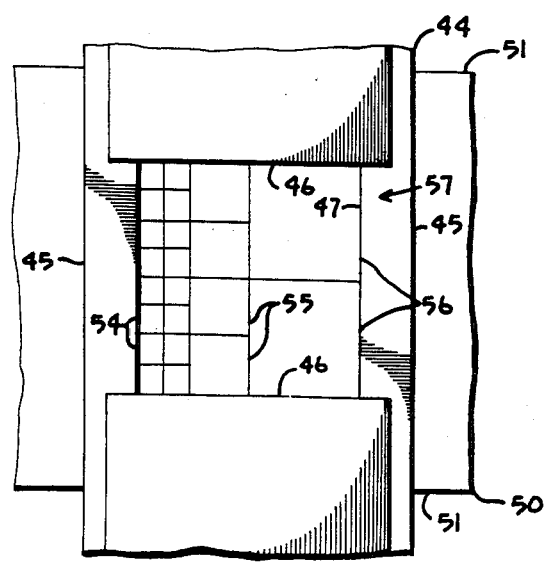
FIG. 2 is a top plan view of the printer particularly showing a section of print paper and a movable mask assembly.

A package printing method utilizing the package printer 1 includes the step of determining a particular mix of photographic prints 54, 55 and 56 which will comprise a batch 57. In the disclosed example, the batch 57 includes a plurality of small (e.g. wallet-size) prints 54, medium-size prints 55 and large prints 56 as shown in FIG. 2. In the example of the method disclosed herein, all of the prints 54, 55 and 56 of the batch 57 are printed from the same negative frame 12. A typical application of a method like this is for printing individual student portraits. If several photographs are taken of each student, proofs may be provided from which the student selects a preferred photograph for batch printing. On the other hand, if only one photograph is taken of each student, the student need only select a batch or package comprising an approximate mixture of print sizes from those offered.

The developed negative filmstrip 11 including the frames 12 to be printed is placed on the filmstrip carrier 5. The operation of the package printer 1 is preferably controlled by a computerized control system (not shown) of a type which is known in the industry and can be programmed for the particular method disclosed herein. The control system receives the necessary input to automatically execute the printing process. The input data might include, for example, the particular filmstrip frames 12 to be printed and the particular composition of the batch 57 to be printed for each frame 12. For example, each frame 12 might have a number or name for the operator's use, which the control system might convert to an address on the filmstrip 11.

Particular batch compositions, i.e. sizes of prints and numbers of each, might also be stored in the control system's memory so that the only input required from the operator would be the indicia of the frame 12 and the indicia of the batch 57.

The control system automatically advances the filmstrip 11 with the synchronous motor 8 until the appropriate frame 12 is centered in the optical axis 13. The filmstrip 11 normally advances in a direction parallel to the X axis.

By shifting the lens turret 20 transversely parallel to the Z axis, prints 54, 55 and 56 may be transversely spaced across the print paper 50 between its opposite side edges 51. The print paper 50 can also be longitudinally advanced along the X axis. The control system is adapted for controlling such movements of the lens turret 20 and the print paper 50, simultaneously if necessary.

The control system also actuates the turret rotating motor 27 to rotate the lens turret 20 whereby the proper lens 22a-c is brought into alignment with the optical axis 13. Each lens 22a-c is used for printing a particular size of print 54, 55 or 56. The mask assembly 44 defines a printing aperture 47 corresponding to the desired print size, and also locates the aperture 47 on the print paper 50 with respect to both the X and Z axes. The control system may be programmed to associate each different size of the printing aperture 47 with a respective lens 22a-c so that the lens turret 20 is rotated to bring the designated lens 22a-c into the optical axis 13 and the mask assembly 44 defines a particular size of printing aperture 47 corresponding to the size of the print 54, 55 or 56 desired.

Alternatively, the sizes of respective prints 54, 55 and 56 may be altered by adjusting the vertical spacing among the lamphouse 2, the filmstrip carrier 5, the lens turret 20 and the printing plane 39. In this manner, prints of different sizes can be produced from a single lens by moving the aforementioned components vertically with respect to each other and by correspondingly adjusting the size of the printing aperture 47 with the mask assembly 44. However, for simplicity and expediency in batch printing, the vertical relationships among the aforementioned components are normally fixed and a set of lenses 22a-c is provided which will accommodate all of the various sizes of prints desired.

The control system is adapted to actuate the shift motor 34 and thereby rotate the shift rod 35 a predetermined number of revolutions, which are counted by the control system to determine the location of the lens turret 20. The shift motor 34 and the control system may include a zeroing feature whereby a predetermined position of the lens turret 20 is considered its "home" position whereat the control system is reset with respect to counting revolutions of the shift motor 34 so that errors and discrepancies are not cumulative.

Preferably the printing sequence is such that the prints 54, 55 and 56 are made transversely across the print paper 50, which is then advanced longitudinally. However, the method could operate in the reverse of this sequence with most of the movement of the print paper 50 along the X axis occurring prior to a transverse shift of the lens turret 20 parallel to the Z axis. Naturally, the Z masking blades 46 must be independently movable to maintain the proper spacing and sizing of the prints 54, 55 and 56 as the printing image moves transversely with respect to the print paper 50.

The control system may be programmed for substantially automatic operation of the package printer 1 wherein a spool 6 of developed filmstrip 11 is loaded onto the filmstrip carrier 5 and a print package comprising small, medium and large prints 54, 55 and 56 is printed for each frame 12. The package printer 1 may be operatively coupled with a developer so that the print paper 50 or cut-off sections thereof are automatically advanced into the developer.

Also, the package printer 1 can be operatively coupled to a developer for the filmstrip 11 so that the exposed filmstrip is placed in the filmstrip developer and fed automatically to the filmstrip carrier 5.

Furthermore, a mirror can be selectively placed in the optical axis 13 for deflecting the image to an alternative printing plane, for example, one parallel to the X and Y axes or normal to the printing plane 39. The alternative printing plane may be used, for example, to print enlargements of a larger scale than is possible with the mask assembly 44 and the print paper 50.

Although off axis cluster printing may be somewhat faster than the method of the present invention because multiple simultaneous printing occurs with the former, the latter method has certain other advantages. A primary advantage is the elimination of the requirement of relatively expensive cluster lenses in favor of utilizing only enough single lenses 22a-c to project the required sizes of prints 54, 55 and 56, regardless of their locations on the print paper 50. A second major advantage relates to the flexibility of the printing method of the present invention whereby the print mix can be varied almost infinitely by location on the print paper 50 and by quantities of respective sizes of prints 54, 55 and 56. It will be appreciated that cluster lenses may be substituted for the single lenses 22a-c disclosed herein to achieve greater speed of operation with the method of the present invention.

It is to be understood that while certain forms of the present invention have been illustrated and described herein, it is not to be limited to the specific forms or arrangement of parts described and shown.

What is claimed and desired to be secured by Letters Patent is as follows:

1. A printer for projecting images from the frames of a filmstrip onto photographic print paper movable along a longitudinal path, which comprises:
   (a) a light source;
   (b) a filmstrip carrier defining a filmstrip path along which said filmstrip is advanced;
   (c) a print paper support defining a printing plane for said print paper and a longitudinal path along which said print paper is movable;
   (d) a lens assembly including:
      (1) a lens turret having a rotational axis extending in a direction perpendicular to said print paper and filmstrip paths;
      (2) a plurality of lenses mounted in radially-spaced relation with respect to said turret rotational axis, each said lens having an optical axis parallel to said lens turret rotational axis;

(3) means for rotating said turret about its rotational axis; and
(4) means for shifting said turret transversely with respect to said print paper path; and (e) a mask assembly including:
  (1) a pair of opposed, longitudinally movable masking blades;
  (2) means for longitudinally moving said longitudinally movable masking blades;
  (3) a pair of opposed, independently transversely movable masking blades;
  (4) means for transversely moving said transversely movable masking blades;
  (5) a printing aperture defined by said opposed pair of masking blades; and
  (6) said mask assembly being mounted over said print paper support with said print paper being adapted for positioning between said print paper support and said mask assembly.

2. A method of making multiple prints of a photographic image, which comprises the steps of:
  (a) defining a first print paper area with a printing aperture formed by a mask assembly;
  (b) projecting light from a light source through exposed film and a lens mounted on a turret onto said first print area;
  (c) differentially transversely shifting a transversely opposed pair of masking blades whereby the transverse dimension of said printing aperture changes and said printing aperture shifts transversely with respect to said print paper;
  (d) defining a second print paper area with said printing aperture formed by said mask assembly;
  (e) simultaneously longitudinally shifting a second pair of longitudinally opposed masking blades towards or away from each other whereby the longitudinal dimension of said printing aperture is decreased or increased;
  (f) projecting light from said light source through said exposed film and said lens onto said second print paper area;
  (g) longitudinally shifting said print paper;
  (h) shifting said filmstrip;
  (i) rotating said lens turret from a first position whereat said image is projected through a first lens to a second position whereat said image is projected through a second lens; and
  (j) automatically adjusting the size of said printing aperture by moving said opposed pairs of masking plates in response to rotation of said turret.

* * * * *